(12) United States Patent  
Srinivasan et al.

(10) Patent No.: US 8,700,575 B1
(45) Date of Patent: Apr. 15, 2014

(54) SYSTEM AND METHOD FOR INITIALIZING A NETWORK ATTACHED STORAGE SYSTEM FOR DISASTER RECOVERY

(75) Inventors: Karthikeyan Srinivasan, Westborough, MA (US); Royce T. Dean, Apex, NC (US); Xun Tian, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 1753 days.

(21) Appl. No.: 11/770,059

(22) Filed: Jun. 28, 2007

Related U.S. Application Data

(63) Continuation-in-part of application No. 11/616,342, filed on Dec. 27, 2006, now Pat. No. 8,234,465.

(51) Int. Cl.
G06F 17/30 (2006.01)

(52) U.S. Cl.
USPC .......................................... 707/655

(58) Field of Classification Search
None
See application file for complete search history.

(56) References Cited

U.S. PATENT DOCUMENTS

| | | | |
|---|---|---|---|
| 2002/0016827 A1* | 2/2002 | McCabe et al. | 709/213 |
| 2003/0135609 A1* | 7/2003 | Carlson et al. | 709/224 |
| 2004/0078467 A1* | 4/2004 | Grosner et al. | 709/226 |
| 2004/0243699 A1* | 12/2004 | Koclanes et al. | 709/224 |
| 2006/0143498 A1* | 6/2006 | Hatasaki et al. | 714/4 |
| 2006/0236061 A1* | 10/2006 | Koclanes | 711/170 |
| 2007/0220248 A1* | 9/2007 | Bittlingmayer et al. | 713/100 |
| 2008/0010485 A1* | 1/2008 | Shitomi et al. | 714/3 |

* cited by examiner

*Primary Examiner* — Mahesh Dwivedi
(74) *Attorney, Agent, or Firm* — Anderson Gorecki & Rouille LLP

(57) ABSTRACT

A method and system for initializing a Network Attached Storage (NAS) system having disaster recovery capabilities uses a communication link disposed between control stations of a source and destination NAS to enable the destination NAS to consolidate configuration and mapping information at a centralized location, thereby enabling validation of disk mirroring and mapping of standby components to be performed in a consistent manner.

13 Claims, 5 Drawing Sheets

SYSTEM AND METHOD FOR INITIALIZING A NETWORK ATTACHED STORAGE SYSTEM FOR DISASTER RECOVERY

RELATED APPLICATIONS

This application is a continuation-in-part and claims priority under 37 C.F.R. §1.20 to patent application Ser. No. 11/616,342 filed Dec. 27, 2006 now U.S. Pat. No. 8,234,465 and entitled "Disaster Recovery Using Mirrored Network Attached Storage", incorporated herein by reference.

FIELD OF THE INVENTION

This invention relates generally to Network Attached Storage (NAS) systems and more particularly a method and apparatus for initializing a mirrored NAS for disaster recovery.

BACKGROUND OF THE INVENTION

Most organizations have a storage system that includes one or more disks or disk arrays for storing file systems for the organization, and one or more file servers which control accesses to the disks. For example, in a Storage Attached Network (SAN) system, external file servers communicate with one or more disk arrays using a Fibre Channel block protocol.

Network Attached Storage (NAS) systems provide an integrated file servers/disk array solution which may be accessed via a traditional Internet Protocol (IP) network, usually via a Local Area Network (LAN) such as the Ethernet. External hosts, referred to as NAS clients, use file server protocols such as Common Internet File System (CIFS) and Network File System (NFS) to communicate with NAS systems. NAS systems typically comprise a 'front end' that includes one or more file servers and a 'back end' that includes multiple disk arrays to provide single site redundancy. Because NAS systems provide an integrated file server/disk array solution that may be easily attached to an existing IP network, file server capacity may easily be increased by adding additional NAS systems, or adding additional file server and/or disk array components to a NAS system as businesses grow.

Often the reliability of the NAS system is a key factor in the ability of the organizations to service customers. Thus it is critical that many organizations, such as financial institutions and the like include backup and recovery mechanisms that allow the NAS to quickly recover from faults and disasters and to continue operation without loss of client data. Disaster Recovery (DR) is a term that refers to the ability to recover from the loss of a complete site, whether due to natural disaster or malicious intent. Disaster recovery strategies include storing copies of data at both primary and backup sites through data mirroring, as well as providing standby data management components at backup sites. In the event of a disaster at the primary NAS, the copy of the production file system stored in backup storage as well as standby data management components may be used to support client applications until the primary NAS is restored. Replicating NAS systems in this manner allows business continuity to be achieved during disasters and other failures.

In order for disaster recovery to be successful, it must be ensured that the backup NAS has at least the same capabilities (including but not limited to number and type of network connections, file system access capabilities to enable business continuity, etc). as the primary NAS; a backup NAS that is unable to provide the features and perform the functions of the primary NAS will not allow full recovery in the event of a disaster. Constructing a NAS capable of disaster recovery involves building a backup (secondary) NAS that has all the capabilities of the primary NAS and failing over components of the primary NAS to mirrored and standby components of the secondary NAS as needed.

Current methods of initializing primary and secondary NAS relationships for disaster recovery lack coordination; typically network administrators at each site perform manual mappings using scripts that are tailored to the particular architecture of each NAS. The primary and secondary NAS are typically geographically remote, and communication between the network administrators regarding the available resources and particular system requirements may be difficult and lack crucial detail. As the types and versions of NAS components continue to grow, it can often be difficult for network administrators to comprehend the capabilities and requirements of the NAS. As a result, components of a primary NAS may be erroneously mapped to components in a backup NAS that do not support its feature set. Such incompatible mappings result are often not evident until disaster recovery is attempted, at which time it may be too late to salvage all file system data. It would be desirable to identify a method and apparatus that would allow a disaster recovery system to be built with accuracy

SUMMARY OF THE INVENTION

According to one aspect of the invention, a method is provided for initializing a mirrored NAS system comprising a primary NAS and a secondary NAS coupled by a communication link. The primary NAS includes a plurality of primary components and the secondary NAS includes a plurality of secondary components. The method includes the step of the secondary NAS retrieving configuration information for each primary component via the communication link and identifying a set of secondary components capable of mapping to the respective primary component. In one embodiment the identified set of secondary components is made available via a user interface to allow a network administrator at the secondary NAS to select one of the secondary components in the set for mapping to the respective primary component.

Such an arrangement enables high speed, accurate identification of components for use in a backup NAS. Ensuring that only the secondary components having the adequate capabilities are considered as standby candidates greatly improves the accuracy of mappings, raising confidence that disaster recovery can truly be supported. In addition, because the present invention uses configuration information that is retrieved directly from the primary and secondary NAS when identifying potential secondary components, candidate identification may be quickly done in software, without regard the number, versions and types of components that are provided in either the primary or secondary NAS.

These and other advantages of the present invention will be described with regard to the below figures.

DETAILED DESCRIPTION

Figure 1:
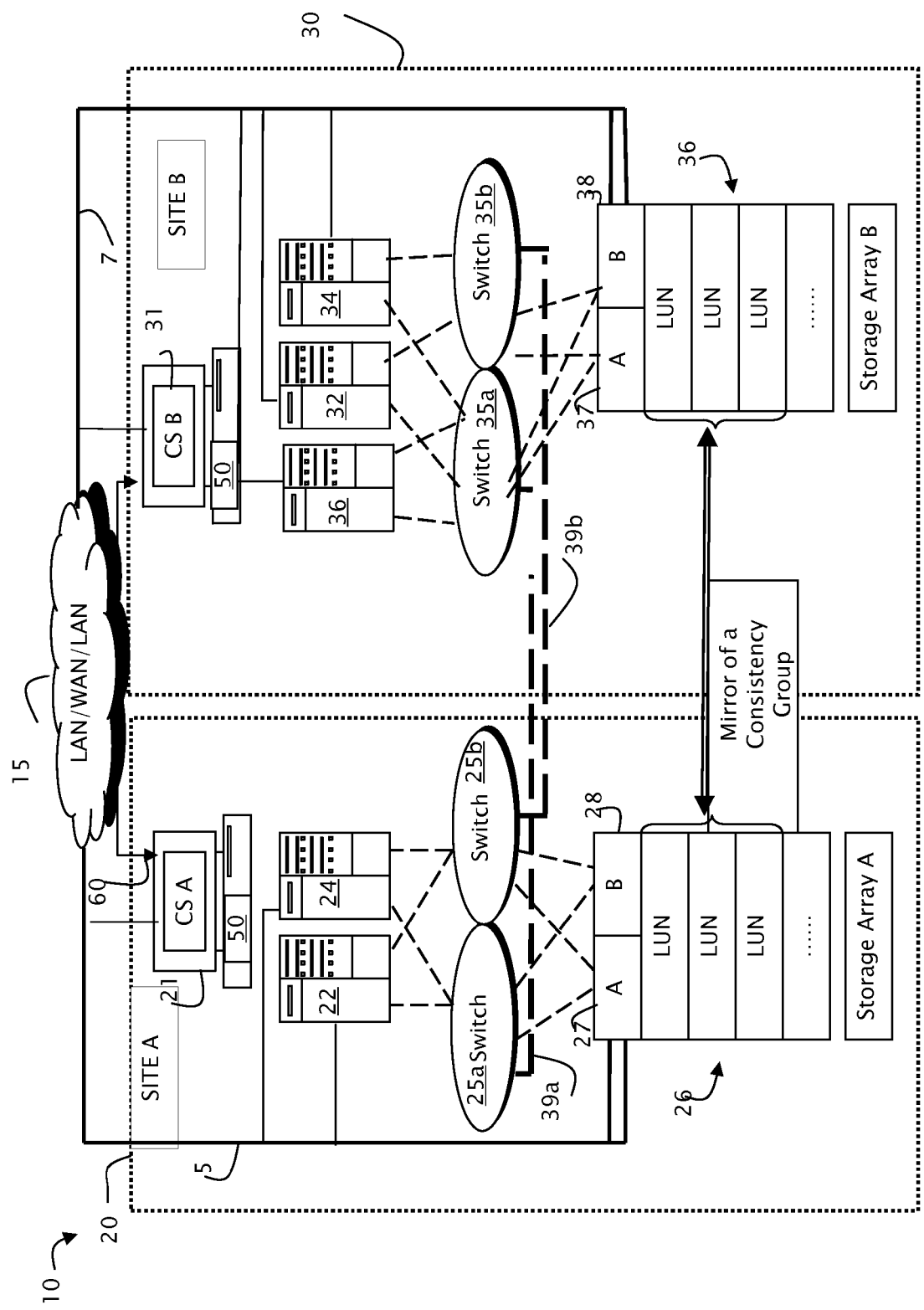
FIG. 1 is a block diagram of a mirrored Network Attached Storage (NAS) system including control stations comprising initialization functionality of the present invention.

FIG. 1 is a block diagram that illustrates exemplary storage components that may be provided at two different sites that provide Network Attached Storage (NAS). As mentioned above, Network Attached Storage (NAS) is a term used to describe a complete NAS which is designed to be attached to a traditional data network such as the LANs 5, 7 and WAN 15.

Each NAS system site includes a front end file server and a back-end comprising one or more disk arrays 26. In one embodiment, the NAS system may be Celerra® Server provided by EMC²® Corporation of Hopkinton Mass., which includes one or more front end Data Mover devices (DMs) 22 and 24 and a back-end comprising a highly available disk array subsystem connected via fibre channel ports 27 and 28.

The file server DMs control the movement of data from the disk arrays to the network in response to NFS/CFIS commands received on the LANs 5, 7. The DMs communicate with the fibre channel ports 27 and 28 using Fibre Channel connections, indicated by dashed lines in FIG. 1. Fibre Channel is a serial, gigabit-speed network technology primarily used for storage networking Fibre Channel switches, such as switches 25a and 25b may advantageously be provided between the storage processors of the disk array and the DMs.

Modern disk/storage arrays are managed by integrated high performance processors. In an embodiment of a NAS such as that described in patent application Ser. No. 11/616, 342 Entitled "Disaster Recovery Using Mirrored Network Attached Storage", each NAS includes a control station that communicates with the disk array management processor over the IP network 5 or the Fibre Channel connection. The control station 21 may be a control station that allows a network administrator to monitor and control the initialization, activation and restoration during disaster recovery.

The present invention comprises control station initialization logic 50 for controlling the mapping of components of a primary NAS to a secondary NAS to support disaster recovery. For the purposes of this disclosure, a 'primary' NAS stores and services a production file system, and a secondary NAS stores a backup copy of the production file system and provides standby NAS functionality for the primary NAS. The primary NAS may also be referred to as a source NAS, and the secondary NAS is referred to as a destination or target NAS in such arrangements. In an active-passive configuration, the sole responsibility of the secondary NAS is to provide backup support for the primary NAS, and the secondary NAS does not service client requests. However, in an active-active configuration, the secondary NAS may also support client requests and store production file systems, and the primary NAS may provide backup support for the secondary NAS. The present invention may be used to establish both active-passive and active-active disaster recovery support.

According to one aspect of the invention, the control stations in the primary 21 and secondary 31 NAS communicate via a communication link 60. In one embodiment the communication link 60 is a Transmission Control Protocol/Internet Protocol (TCP/IP) communication link established across LAN/WAN 15. As will be described in more detail below, the secondary NAS uses the communication link to query the primary NAS for information regarding primary NAS configuration. The secondary NAS then utilizes the configuration information to validate device mappings and to identify candidate components in the secondary NAS that can be used as standby components.

Primary and Secondary NAS are also communicatively coupled via mirroring links 39a and 39b. The Mirroring Links 39a and 39b (in one embodiment implemented as Fibre Channel links) are used to forward data from the primary NAS to the secondary NAS to maintain consistency between the contents of the disk arrays of the two devices.

In FIG. 1, NAS system 30 includes components that may be provided to mirror functionality of the primary NAS system 20. For example NAS 30 includes file server DMs 32 and 34 and 36, fibre channel ports 37 and 38, Fibre Channel switches 35a and 35b and disk array 36. During disaster recovery initialization, components of the secondary NAS 30 are mapped to components of the primary NAS 20; in the event of a disaster, operations of the primary NAS may be failed over to the secondary NAS, with one or more components of the secondary NAS effectively standing in for the failed components of the primary NAS. The focus of this application is on the selection of components in the secondary NAS as mirroring candidates for replacing components of the primary NAS.

One goal of the present invention is to identify components in the secondary NAS having at least the capability of the primary NAS. Errors or omissions to the replication may result in interruption or lost data during the failover. For example, although multiple DMs are shown to exist in the secondary NAS, the initialization process of the present invention ensures that only those DMs having at least the capabilities of DMs 22 and 24 will be identified as standby candidates.

The present invention performs initialization in two stages; during the first stage the mappings between disk devices on the primary NAS and secondary NAS are validated. During the second stage, candidate components capable of providing standby support for components in the primary NAS are identified and presented to a system administrator to allow the system administrator to complete component mapping. Both of these stages will be described in more detail below.

Figure 2:
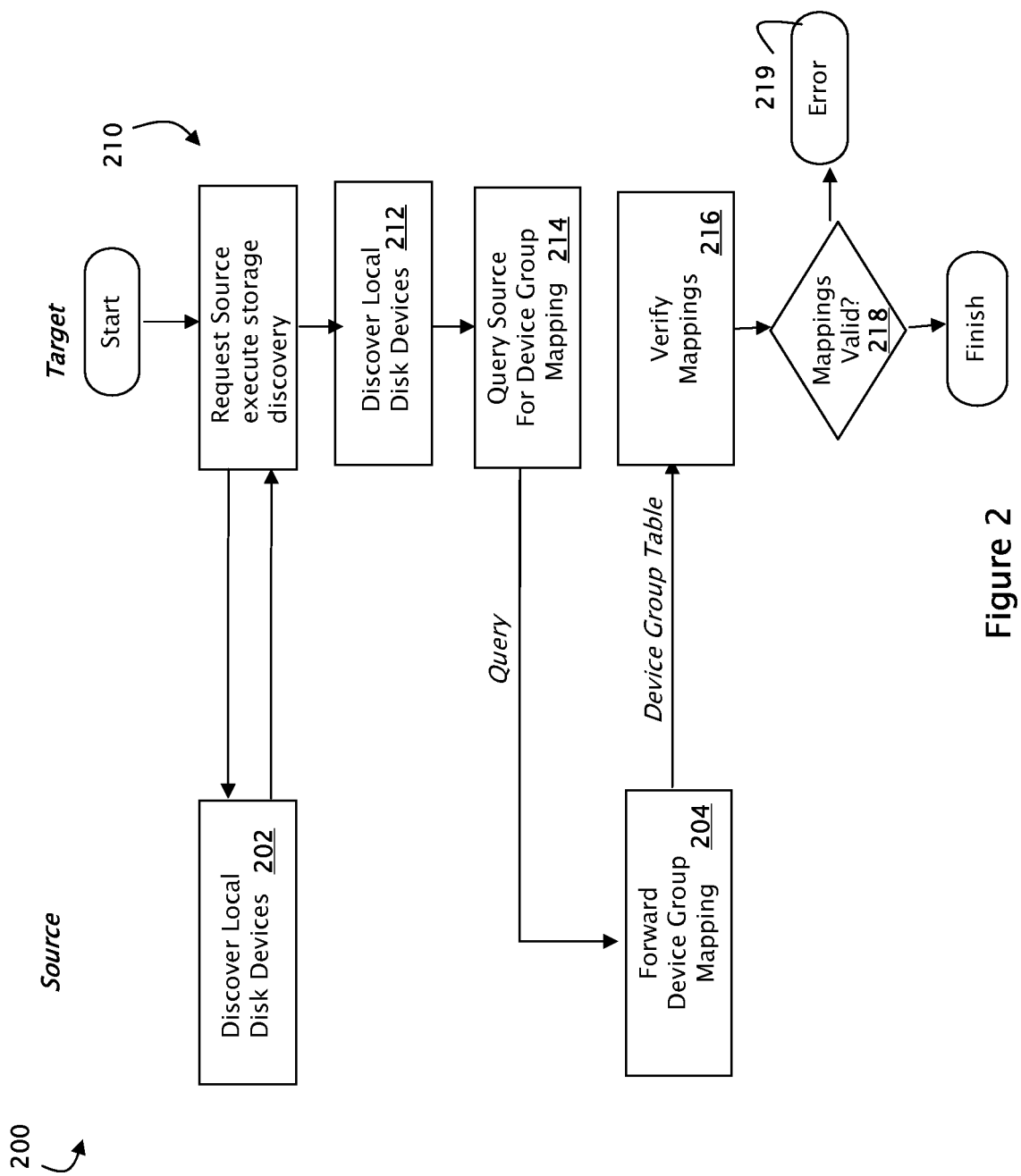
FIG. 2 is a flow diagram illustrating exemplary steps that may be performed to verify remote device mappings between a source NAS and a destination NAS.

Referring now to FIG. 2, a flow diagram illustrates exemplary steps that may be performed by initialization logic 50 of a target NAS control station 31 as it communicates with a source NAS control station during a first phase of disaster recovery initialization. At steps 202 and 212, each of the respective source and target NAS set up local storage at their site by discovering coupled disk devices. For example, a disk mark or other operation is executed at each site. Each discovered disk is added to a disk table, maintained at each site.

During this process, the mirroring links are used by the source site to 'discover' disk devices at the target. The source populates its disk table with mirrored remote device group information. One aspect of the initialization process involves verification that the remote devices identified in each device group are, in fact, present on the remote device. Thus at step 214 the target NAS queries the source NAS to retrieve the device group mapping. The query is forwarded from control station 31 to control station 21 via the communication link 60. At step 204, when the source NAS receives the query, it forwards the device group mappings to the target NAS.

Figure 3:
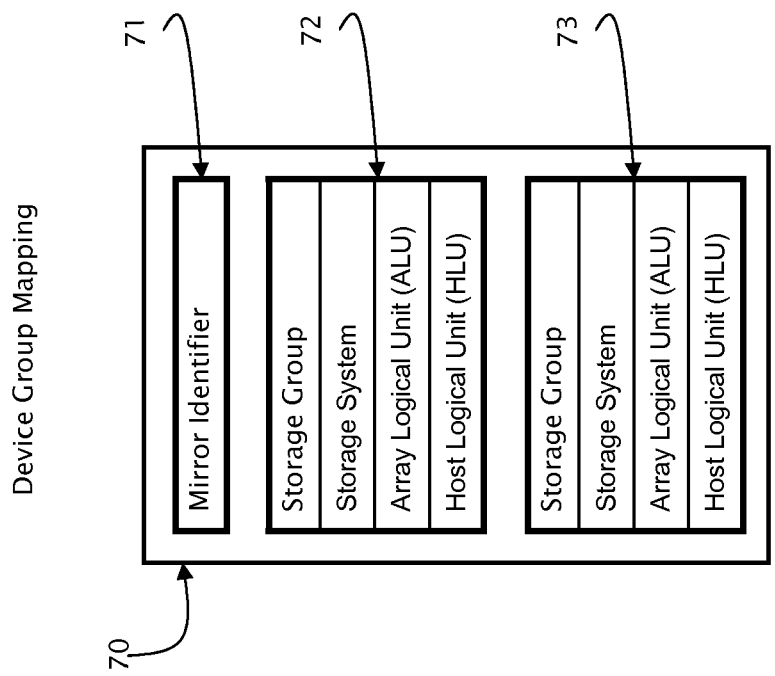
FIG. 3 illustrates exemplary fields that may be included in a device group table that forwarded to the target NAS in the process of FIG. 2.

FIG. 3 illustrates one device group mapping entry 70. Each entry is comprised of the logical mirror name 71 and data describing the source 72, and destination 73 images and their respective mapping to the NAS Data Mover services. In one embodiment, the device group mappings may be forwarded either over the communication link to the target NAS. In an alternate embodiment, the target device can obtain the device group mappings by locally mounting the device that stores the mirrored copy of the configuration database to read the mirrored copy of the device group mappings.

However the device group mappings are obtained, at step 216 the initialization logic 50 on the target validates the presence of all remote mirrors at the target site. If one or more disks cannot be found at the target, at step 219 the system administrator is signaled of the error. If all the remote mirrors are found at the target, then the remote disk mapping portion of the disaster recovery initialization is complete.

Figure 4:
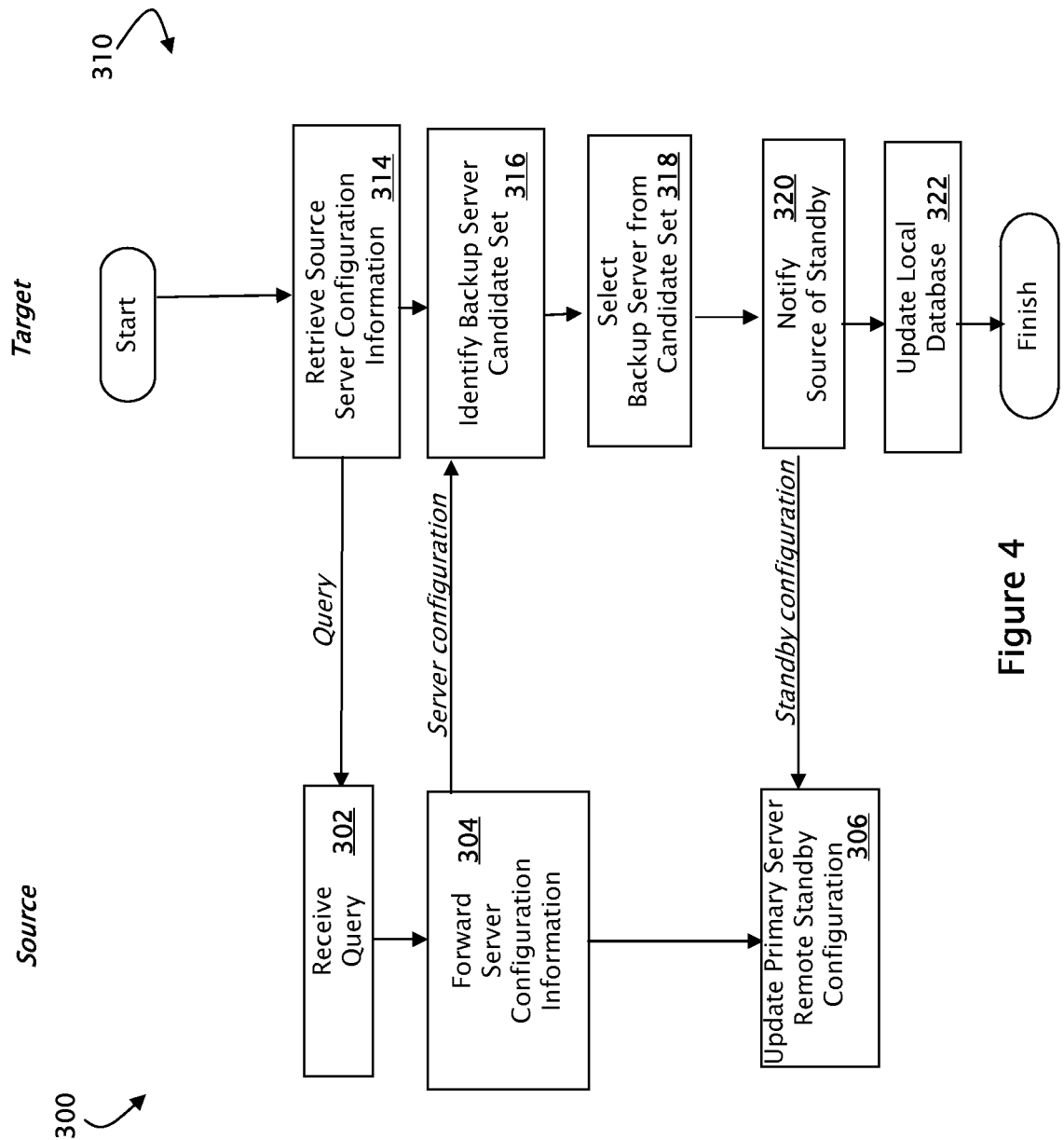
FIG. 4 is a flow diagram illustrating exemplary steps that may be performed to identify and assign standby target NAS components to source NAS components.

Referring now to FIG. 4, following disk device validation, the process of identifying standby components by the target NAS begins. At step 314, the target NAS forwards a query to the source NAS, requesting source configuration information. The configuration information may be forwarded either directly over the communication link 60. The query to the source returns the source configuration. From this information it is determined which primary Data Movers can be configured with remote standby's.

At step 318 the initialization logic at the target NAS retrieves configuration information associated with target components and compares the requirements of each source components requiring standby support against the capabilities of the target components. In response to the comparison, the identification logic identifies a set of candidate components for each source component requiring standby support. In one embodiment, the set of candidates is displayed to the network administrator, via an interface such as a text based menu or the like.

When determining whether a target component is a selectable candidate, the initialization software evaluates both the availability and compatibility of the candidates. Availability may be indicated by a Standby field in the configuration table that identifies whether the component is currently acting as standby, and for whom. Table I illustrates exemplary conclusions of the selectability of a component based on various availability states of the component. It should be understood that the states of Table I are provided by way of example only and it is recognized that different conclusions may be drawn in response to differing NAS requirements.

TABLE I

| Condition | Selectable | Description |
| --- | --- | --- |
| is remote standby for server_x | N | This Data Mover is configured as a remote standby |
| remote standby is server_x | N | This Data Mover is configured with a remote standby Active/Active |
| remote standby | N | This Data Mover is configured as a remote standby but source Data Mover can't be determined |
| local standby | N | One or more of the Data Movers configured to use this local standby are not remote standbys |
| Unconfigured standby | Y | This Data Mover is configured as a standby however no primary Data Movers are configured to use it |
| local standby for remote standbys | Y | This Data Mover is configured as a local standby, all Data Movers configured to use this local standby are remote standbys |
| Non-root file system mounted | N | This Data Mover has one or more user file systems mounted, can't be a standby |
| not compatible | N | The source Data Mover has one or more network devices not available on this Data Mover |
| local file system mounted | N | The source Data Mover has one or more file systems mounted which use local storage. The local storage can be for the PFS or any backup |

TABLE I-continued

| Condition | Selectable | Description |
| --- | --- | --- |
| | | objects such as SnapSure savVols etc . . . |
| IP Replicator active | N | The source Data mover has one or more replication source or destination file systems mounted. |

If it is determined that a component is selectable and thus a candidate component, the compatibility of the candidate is then determined. In general any standby candidate must have the same network device features as the primary component; candidates having a superset of the characteristics are considered valid standby candidates. Configuration features that may be evaluated when determining compatibility include, but are not limited to, number of ports, speeds and feeds, number of blades, operating system version, network connections, disk device visibility, software feature compatibility with DR. The present invention, however, is not limited to the use of any particular configuration characteristic; rather any configuration characteristic in use today or determined relevant in the future may be readily substituted herein without affecting the scope of the present invention. In one embodiment, components and configuration characteristics may be stored in object oriented data structures that may be quickly filtered to detect appropriate candidates. Such embodiments may be easily adapted to accommodate new components having different features as product lines evolve.

At step 318, once the set of candidates has been identified, the set is made available to the network administrator, to allow the administrator to select one of the candidates as a standby. In one embodiment, the candidates are displayed at the user interface to allow the network administrator to manually select a candidate from the set. Alternate embodiments may provide some degree of automation of selection, for example when only one candidate is available, or to perform selection based on a learned preference for disaster recovery configuration, etc. Once the candidate standby component is selected, the standby servers are setup and remote commands are sent to the source site at step 320, identifying the selected candidates. At step 322 the target NAS updates local configuration information to reflect the selection of the candidate components as standby components for the source NAS.

Figure 5:
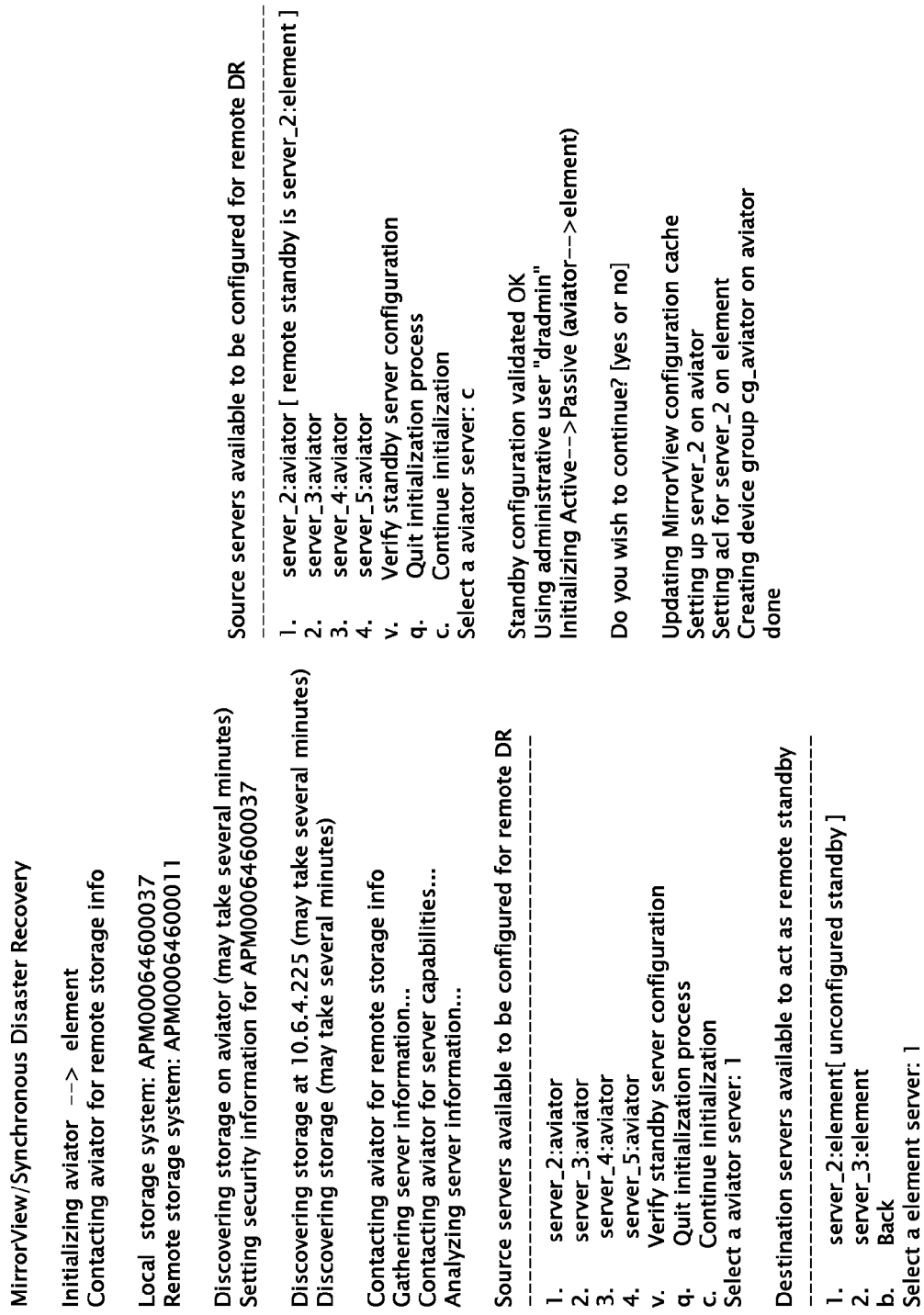
FIG. 5 illustrates exemplary command line interface output obtained during an initialization process of FIGS. 2 and 4.

An example output session that may be produced at an interface executing an active/passive mirroring configuration of a source NAS (referred to in the Figure by the name of 'aviator') to a destination NAS (referred to in the figure by the name of 'element') is shown in FIG. 5. In the example of FIG. 5, element NAS comprises four servers (server_2 through server_5) that are available to be configured for disaster recovery purposes. After evaluating candidate components at aviator NAS, it is determined that aviator comprises two servers, server_2 and server_3, which could provide remote standby support for element server_2. The user selects server_3, and the appropriate databases at each NAS are updated to reflect the mapping.

Accordingly an improved method for initializing a NAS having disaster recovery capabilities has been shown and described. The method uses a communication link between control stations of remote NAS devices to consolidate configuration and mapping information at a centralized location (for example, the target NAS), thereby enabling validation of disk mirroring and mapping of standby components to be performed in a consistent manner. In one embodiment, the initialization process comprises software code and object oriented data structures that may be easily updated and quickly filtered to identify candidate components.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method for initializing a mirrored Network Attached Storage (NAS) system for disaster recovery, wherein the mirrored NAS comprises a source NAS comprising a plurality of source components and a target NAS comprising a plurality of target components, the source NAS and target NAS being coupled via a communication link, the method including the steps of:

the target NAS querying the source NAS via the communication link to obtain configuration information for the source NAS; and the target NAS initializing the mirrored NAS for disaster recovery in response to the configuration information.

2. The method of claim 1, wherein the target NAS queries the source NAS for disk mapping information, and wherein the step of the target NAS initializing includes the step of the target NAS validating mirror mappings of the source disk devices to the target disk devices.

3. The method of claim 2 wherein the step of the target NAS validating mirror mappings includes the step of the target NAS validating the existence of target disks identified as remote disks in the disk mapping information.

4. The method of claim 1 wherein the target NAS queries the source NAS to identify servers needing standby support.

5. The method of claim 4 wherein, in response to a target NAS query, the target NAS receives configuration information associated with a source server seeking standby support.

6. The method of claim 5 further comprising the step of the target NAS identifying target servers that are available to provide standby support to the source server.

7. The method of claim 6 further comprising the step of filtering a configuration database associated with available target servers using the configuration information associated with the source server to identify a set of candidate components capable of providing standby support for the source server.

8. The method of claim 7 including the step of providing the set of candidate servers to a network administrator.

9. The method of claim 8 including the step of selecting one identified candidate from the set of identified candidates as a standby for the source server and notifying the source NAS of the identified candidate.

10. A control station coupled to a remote Network Attached Storage (NAS) comprising:

an interface for establishing a communication link with control stations of a source NAS;

means for retrieving source configuration information from the source NAS, means for retrieving remote configuration information from the remote NAS;

initializing disaster recovery relationships between the source NAS and the remote NAS in response to the source configuration information and the remote configuration information, the step of initializing including validating device mappings and identifying standby candidate servers at the remote NAS to associate with for servers in the source NAS.

11. The control station of claim 10, wherein the communication link is a Transmission Control Protocol/Internet Protocol (TCP/IP) link.

12. The control station of claim 10 wherein the configuration information comprises a device map, and wherein the step of initializing includes the step of validating the presence, at the remote NAS, of any remote devices identified in the device map.

13. The control station of claim 10 wherein the configuration information comprises server configuration information and wherein the step of identifying standby candidates evaluates the compatibility of source servers and target servers using the server configuration information.

* * * * *